United States Patent
Rupp et al.

(10) Patent No.: US 8,544,589 B1
(45) Date of Patent: Oct. 1, 2013

(54) APPARATUS FOR DEFLECTING A VEHICLE AWAY FROM AN OBJECT DURING AN OFFSET FRONTAL IMPACT

(75) Inventors: Jeffrey Dan Rupp, Ann Arbor, MI (US); Michelle Duan, Northville, MI (US); Hassen Hammoud, Dearborn, MI (US); Benjamen David McClain, Clawson, MI (US); Stephen Thomas Kozak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/464,137

(22) Filed: May 4, 2012

(51) Int. Cl.
*B60R 19/16* (2006.01)
*B62D 21/15* (2006.01)

(52) U.S. Cl.
USPC ........... 180/274; 180/311; 280/784; 280/770; 296/187.1; 296/187.03; 293/114; 293/132; 293/150

(58) Field of Classification Search
USPC ......... 180/274, 311; 280/784, 770; 293/114, 293/132, 149, 150; 296/187.03, 187.09, 296/187.1, 187.12
See application file for complete search history.

(56) References Cited

U.S. PATENT DOCUMENTS

| | | | |
|---|---|---|---|
| 3,881,742 A * | 5/1975 | Felzer | 280/784 |
| 5,275,436 A | 1/1994 | Pomero | |
| 5,482,322 A * | 1/1996 | Wheatley et al. | 280/784 |
| 6,286,867 B1 * | 9/2001 | Braemig et al. | 280/784 |
| 6,511,119 B2 | 1/2003 | Takase et al. | |
| 6,866,115 B2 | 3/2005 | Miyasaka | |
| 7,438,151 B2 * | 10/2008 | Winkler | 180/274 |
| 7,819,218 B2 | 10/2010 | Eichberger et al. | |
| 7,900,995 B2 * | 3/2011 | Sato et al. | 296/187.1 |
| 7,926,847 B2 | 4/2011 | Auer et al. | |
| 8,454,080 B2 * | 6/2013 | Qu et al. | 296/187.1 |
| 2010/0140965 A1 * | 6/2010 | Schoenberger et al. | 293/118 |

OTHER PUBLICATIONS

Dr. Winkler Stephan et al., "Sliding Collisions in Case of Frontal Crash with Small Lateral Offset", Vehicle Safety Department/Crashsimulation, pp. 1-12.

* cited by examiner

*Primary Examiner* — Joseph Rocca
*Assistant Examiner* — Darlene P Condra
(74) *Attorney, Agent, or Firm* — Raymond L. Coppiellie; Brooks Kushman P.C.

(57) ABSTRACT

A deflector is attached to a frame on a vehicle in front of a front wheel which cooperates with the front wheel to glance a vehicle past a laterally offset impacting object. The deflector acts as a first boundary against the impacting object and the deflector turns the front wheel inboard to an inwardly turned position to act as a second deflecting boundary against the impacting object. The deflector and inwardly turned front wheel cooperate to deflect the vehicle past the object, such that the object passes outboard of a rocker member on the vehicle.

20 Claims, 3 Drawing Sheets

US 8,544,589 B1

APPARATUS FOR DEFLECTING A VEHICLE AWAY FROM AN OBJECT DURING AN OFFSET FRONTAL IMPACT

TECHNICAL FIELD

This disclosure relates to a deflector attached to a vehicle frame that turns a front wheel of the vehicle inward towards the frame to use the front wheel as a deflection surface against an impacting object during a laterally offset frontal impact with the impacting object.

BACKGROUND

Vehicles are designed and tested for impact worthiness. Frontal impact tests previously focused on impacts with objects engaging both frame rails, centrally located between the frame rails of the vehicle, or to engage only one of the frame rails. The bumper beam of a vehicle is generally secured to the vehicle frame through crush cans, or other intervening structures, that are designed to absorb straight on impact energy during frontal impact tests.

Recently, more stringent standards have been proposed that are designed to test a frontal vehicle impact with an object, such as a radiused wall, that is located in the outer one-fourth of the transverse width of the vehicle. Impacts in this area may be outboard of the vehicle frame rails and outboard of the current intervening structures, yet remaining inboard of other vehicle structural members such as rocker members. The impacting object may intrude into the vehicle quarter panel and the rocker member that by itself may not provide as much energy absorption as the vehicle frame provides in a frontal impact centrally located across or between the frame rails or impacting one of the rails.

There is a need to improve the crash worthiness of the vehicle when impacting a laterally offset object. This disclosure addresses the above problems and challenges relating to vehicle design as summarized below and with reference to the illustrated embodiments.

SUMMARY

According to one aspect of this disclosure, an apparatus for turning a front wheel inward during an offset frontal impact between an impacting object and a vehicle is disclosed. The vehicle has a frame with a bumper beam and a frame rail. The bumper beam has a span extending transversely across the vehicle and the frame rail extends longitudinally on the vehicle behind the bumper beam within the span of the bumper beam. The front wheel is disposed on the vehicle longitudinally rearward of the bumper beam and transversely outboard of the frame rail. The apparatus comprises a deflector connected to the frame longitudinally forward of the front wheel and the deflector has at least a normal position and a deflecting position.

The deflector has an impact force receiving segment with an inboard end connected to a point on the frame. In the normal position the impact receiving segment extends from the frame transversely outboard and longitudinally rearward to an outboard end longitudinally forward of and offset from the front wheel. The deflector also has a reaction force segment having a reaction end spaced from and substantially vertically planar with a portion of the frame rearward of the point on the frame where the inboard end is connected when in the normal position. The reaction force segment extends transversely outboard from the frame rail to an engaging end longitudinally forward of and offset from the front wheel in the normal position. The deflector has an elbow segment disposed between the impact receiving segment and the reaction force segment. The elbow connects the outboard end of the impact force receiving segment to the engaging end of the reaction force segment. In the normal position, at least a portion of the elbow segment extends transversely outboard of an inner edge of the front wheel.

The deflector deforms into the deflecting position when an object impacts a vehicle during an offset frontal impact of the object with the vehicle. In the deflecting position, the engagement end of the reaction force segment and the elbow cooperate to engage a portion of the front wheel turning the front wheel inward toward the frame.

According to another aspect of this disclosure, an apparatus for glancing a vehicle past a laterally offset impacting object is disclosed. A deflector is attached to a frame of a vehicle longitudinally forward of a front wheel. The deflector deforms during a laterally offset impact with an object turning the front wheel inward to provide an outer surface of the front wheel as a deflection surface against the object.

According to yet another aspect of this disclosure, a system for deflecting a vehicle away from an object during a lateral offset impact with the object is disclosed. The system comprises a deflector having a normal position, and a sliding position. In the normal position, the deflector is connected to the vehicle and extends from the vehicle in front of and spaced from the front wheel. When the vehicle impacts a laterally offset object, the forces from the impact move the deflector into the sliding position. In the sliding position, the deflector extends from the vehicle in front of and engages the front wheel turning the front wheel inward toward the vehicle into an inwardly turned position. The deflector in the sliding position deflects a first portion of the vehicle past the object. The front wheel in the inwardly turned position deflects a second portion of the vehicle past the object.

The above aspects of the disclosure and other aspects will be apparent to one of ordinary skill in the art in view of the attached drawings and the following detailed description of the illustrated embodiments.

DETAILED DESCRIPTION

A detailed description of the illustrated embodiments of the disclosed concept is provided below. The disclosed embodiments are examples that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
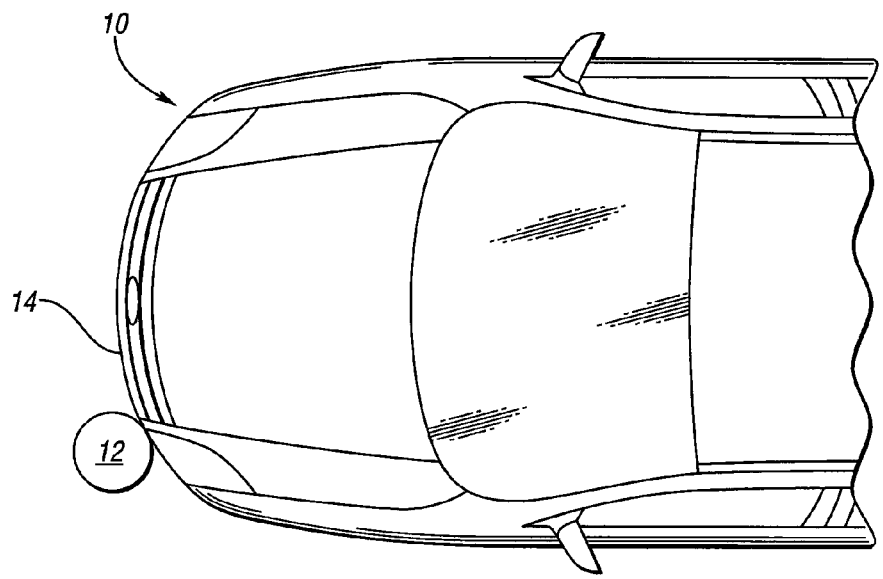
FIG. 1 is a partial top view of a vehicle contacting an object laterally offset in the outer portion of the transverse width of the vehicle.
Figure 2:
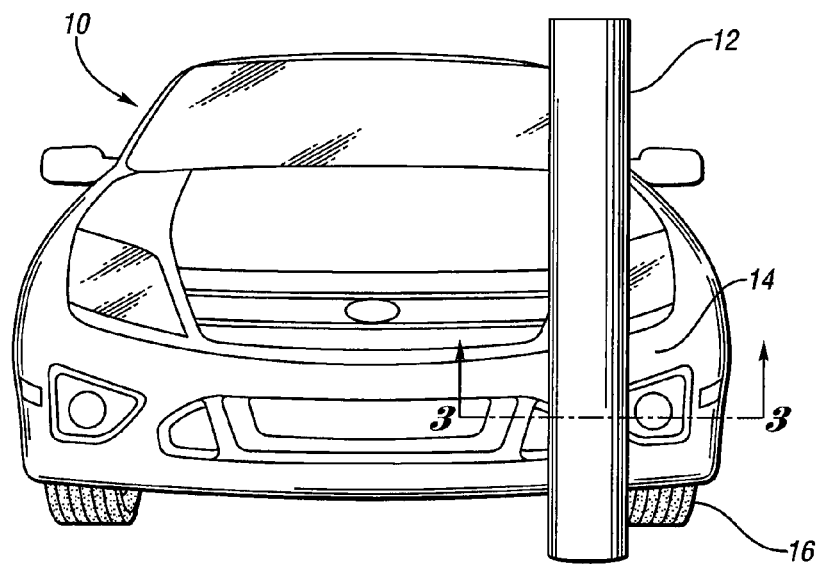
FIG. 2 is a front view of a vehicle contacting a laterally offset pole.

Referring to FIGS. 1 and 2, a vehicle 10 is shown contacting an object 12 in an outer portion of the transverse width of the vehicle 10. The object 12 is shown in contact with a front end body panel 14, or fascia, of the vehicle 10 and generally in front of a front wheel 16. A laterally offset frontal impact may generally be defined as an occurrence in which a front end of a vehicle impacts an object head-on in the outer one-fourth of the transverse width of the vehicle. The object 12 may be a rigid barrier such as a radiused wall as used in some test procedures, another vehicle as in a cross-over collision of two vehicles, a pole, or any item having the mass or rigidity that may encroach into the vehicle during the impact of the vehicle with the object.

FIGS. 3-8 are a series of diagrammatic views illustrating the progression of the object 12 as it moves through a corner of the vehicle 10 involved in a laterally offset frontal impact with the object 12. The diagrammatic views are generally cross-sectional views of section 3-3 from FIG. 2 taken through the center of a front wheel 16. Many vehicle components unrelated to this disclosure are not shown for better visibility. The figures are diagrammatic in that the remaining components shown may not be in the same plane as the section cut through the center of the front wheel 16.

The vehicle 10 may have a frame 20 comprising at least a bumper beam 22 and a frame rail 24. The bumper beam 22 may extend transversely across a portion of the vehicle 10 behind the front end body panel 14. The bumper beam 22 may be transversely centered on the vehicle 10 and have a length or span that extends across roughly half of the vehicle 10. In some vehicles, ends 26 of the bumper beam 22 extend into the outer one-fourth of the transverse width of the vehicle 10, and in other vehicles the ends 26 of the bumper beam 22 do not extend into the outer one-fourth of the transverse width of the vehicle 10.

Frame rails 24 may extend generally longitudinally behind and within the span of the bumper beam 22. In many vehicles, crush cans 28 are disposed between the bumper beam 22 and the frame rail 24. Crush cans 28 may be separate units that bolt on to the frame rail 24, bumper beam 22, both, or neither, or the crush cans may be integrated directly into the frame rail or bumper beam, such that a portion of the frame rail or bumper beam function as crush cans. Crush cans 28 may be used to absorb energy during an impact. Crush cans 28 may also allow the bumper beam 22 to move longitudinally rearward on the vehicle 10 during an impact reducing the distance between the bumper beam 22 and the frame rail 24.

The front wheel 16 is connected to the vehicle 10 through a front end suspension system 30. The front wheel is disposed on the vehicle 10 longitudinally rearward of the bumper beam 22 and transversely outboard of the frame rail 24. The front end suspension system 30 may have a hub and bearing assembly 32 that allows the front wheel 16 to radially rotate on the vehicle. A forward facing radial portion 34 of the front wheel 16 provides a leading surface whether the front wheel 16 is rotating or not.

The hub and bearing assembly 32 may be attached to a knuckle, which is also connected to a steering system that allows the front wheel to track straight with the vehicle 10 or to be turned inwardly or outwardly. The knuckle, steering system, and ability to turn inward and outward is represented in the Figures by a front wheel steering axis 36. The front wheel 16 is shown in a straight position in FIGS. 3-5 and in an inwardly turned position in FIGS. 6-8.

The front wheel 16 may have an inner rim 40 defining an inner edge 42. The inner edge 42 may be a surface of the front wheel 16 which is the furthest transversely inboard relative to the vehicle 10 when the front wheel 16 is in the straight position. The front wheel 16 may also have an outer rim 44 defining an outer surface 46. The outer surface 46 may be a surface of the front wheel 16 which is the furthest transversely outboard relative to the vehicle 10 when the front wheel 16 is in the straight position. The front wheel 16 may also have a disk 48 mounted to the hub and bearing assembly 32. The outer surface 46 is located on the outer rim 44, but may be defined by the disk 48 of the front wheel 16 in other wheel configurations. The outer rim 44 during impact may deform changing the outer surface 46 from the outer rim 44 to the disk 48, or a combination of the two. The outer surface 46 may be any surface of the front wheel 16 that contacts the object 12 during the offset impact to provide a glancing surface or deflective boundary against the object 12.

The front wheel 16 may also include a tire 50. The tire 50 shown in the Figures is a pneumatic tire mounted on the bead seats of the inner and outer rims 40, 44. Although the Figures show a front wheel 16 with rims 40, 44, supporting the pneumatic tire 50, other wheel configurations may be used that use a different type of tire, a different type of mounting configuration, or even no tire at all.

The vehicle 10 may have a wheel well body panel 52 that substantially surrounds the front wheel 16 defining a wheel well 54 in which the front wheel 16 has freedom to rotate, steer, and articulate with the front end suspension system 30. Substantial contact of the tire 50 with the wheel well body panel 52 is avoided during normal use of the vehicle 10. The vehicle may also have a rocker member 56 extending generally longitudinally rearward of the front wheel 16 behind the wheel well body panel 52. The rocker member is disposed transversely outboard from the frame 20, and may be generally parallel to the frame rail 24.

A deflector 60 may be attached to the frame 20 of the vehicle 10 longitudinally forward of the front wheel 16 to reduce the extent of intrusion of a laterally offset impacting object. The deflector 60 has an impact force receiving segment 62 with an inboard end 64 and an outboard end 66, a reaction force segment 68 with a reaction end 70 and an engaging end 72, and an elbow segment 74 disposed between the outboard end 66 of the impact force receiving segment 62 and the engagement end 72 of the reaction force segment 68. The elbow segment 74 may be rounded without a distinct beginning or ending transition between adjacent segments. The deflector 60 may be a single unitary piece or may be made up of multiple pieces connected together. The deflector 60 may be made from a metal such as steel, preferably a steel with similar strength characteristics as that of the frame 20, however other materials may be used. The deflector 60 may also include additional structural members, or a web, connecting the force receiving segment 62 and the reaction force segment 68.

Figure 3:
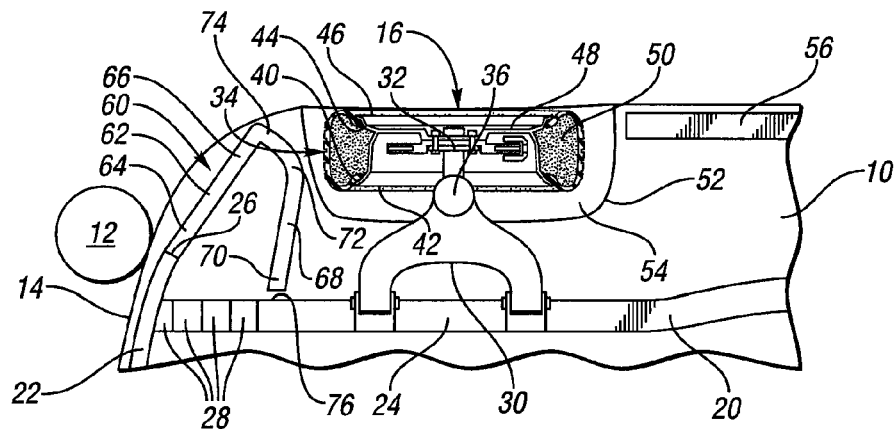
FIG. 3 is a diagrammatic bottom view of a front corner of a vehicle contacting a laterally offset pole.

The deflector 60 has a normal position, one embodiment of which may be seen in FIG. 3. The deflector 60 may be deformed into a number of other positions such as deflecting and sliding positions, embodiments of which may be seen in FIGS. 6 and 7.

FIG. 3 shows the deflector 60 in a normal position with the inboard end 64 of the deflector 60 connected to the frame 20 at the end 26 of the bumper beam 22. The deflector 60 may be connected to other locations on the frame 20, however if the frame utilizes crush cans 28, it is preferred to have the deflector connect to the frame 20 longitudinally forward of the crush cans 28. In the normal position when connected to the bumper beam 22, the impact force receiving segment 62 extends from the frame 20 transversely outboard and longitudinally rearward to the outboard end 66 longitudinally forward of and offset from the front wheel 16. In the embodiment shown, the impact force receiving segment 62 is generally straight throughout the length of the segment, however it is envisioned that other shapes may be used as long as they provide similar deflection, sliding and wheel turning capability.

In the normal position, the reaction end 70 of the reaction force segment 68 is spaced from and substantially vertically planar with a portion of the frame 20. The reaction end 70 may be aligned with a receiving point 76 on the frame rail 24. The receiving point 76 is rearward of the point on the frame where the inboard end 64 of the impact force receiving segment 62 is connected. The reaction end 70 of the reaction force segment 68 is offset and not connected to the frame 20 so that the crush cans 28 may function without interference from the deflector 60. The reaction end 70 is substantially vertically planar with a portion of the frame 20 so that the reaction end 70 aligns with the receiving point 76 and contacts the frame 20 during an offset impact with an object. The frame 20 provides a boundary condition for the deflector 60 to engage and react against as it deforms during impact. It is envisioned that the reaction end 70 may be attached to the frame rail 24, as long as the deflector 60 did not interfere with the function of the crush cans 28. One such alternative would be to provide a hinge in the deflector 60 near the elbow segment 68.

In FIG. 3, the reaction force segment 68 is shown extending transversely outboard from the frame rail 24 to its engaging end 72. The reaction force segment 68 is longitudinally forward of and offset from the front wheel 16.

The elbow segment 74 is disposed between and connects the outboard end 66 of the impact force receiving segment 62 and the engaging end 72 of the reaction force segment 68. In the normal position, at least a portion of the elbow segment 74 extends transversely outboard of an inner edge 42 of the front wheel 16 when the front wheel 16 is in a straight position. The elbow segment 74 may be disposed between the inner edge 42 and the outer surface 46 of the front wheel 16 when the front wheel is in a straight position. In this embodiment the elbow segment 74 does not extend transversely outboard past the outer surface 46 of the front wheel 16. In the normal position, the impact force receiving segment 62 and the reaction force segment 68 may each be straight sections which form an acute angle at the elbow segment 74. In other embodiments the impact force receiving segment 62, the reaction force segment 68, or the elbow segment 74 may have a curvature through a portion of the respective segment providing differing angles, or curves, between the transitions of each segment.

Figure 4:
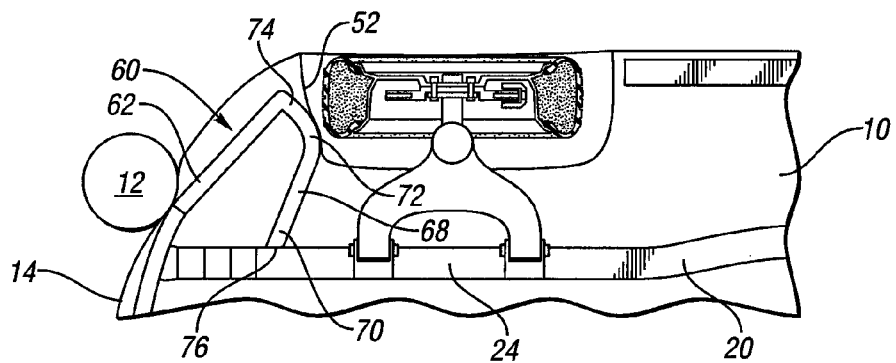
FIG. 4 is a diagrammatic bottom view of a front corner of a vehicle contacting a laterally offset pole with the object pushing into a front fascia of the vehicle and initially engaging a deflector.

Referring to FIG. 4, the vehicle 10 is shown impacting the object 12 as the object 12 pushes into the front end body panel 14. The object 12 engages the impact force receiving segment 62 of the deflector 60 causing the deflector 60 to deform. During the deformation, the reaction end 70 of the reaction force segment 68 may contact the frame 20. The engaging end 72 of the reaction force segment 68 or a portion of the elbow segment 74 may contact the wheel well body panel 52.

Figure 5:
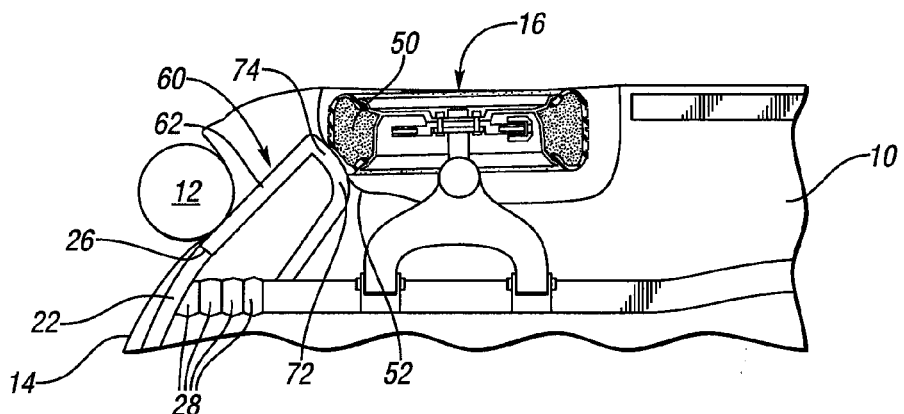
FIG. 5 is a diagrammatic bottom view of a front corner of a vehicle contacting an object with the object deforming a deflector into a wheel well body panel and initially engaging a tire of a front wheel.

Referring to FIG. 5, the vehicle 10 is shown impacting the object 12 with the object 12 being moved further into the front end body panel 14. The forces of impact with the object 12 may push an end 26 of the bumper beam 22 longitudinally rearward into the vehicle 10. The force of impact with the object 12 may also compress the crush cans 28, absorbing some of the energy of the impact and moving the deflector 60 longitudinally rearward closer to the front wheel 16. In a lateral offset impact the object 12 may engage a portion of the bumper beam 22 directly, or the object 12 may pass transversely outboard of the end 26 of the bumper beam 22. The force of impact may affect the bumper beam 22 and crush cans 28 in either scenario.

The object 12 continues to engage the impact force receiving segment 62 of the deflector 60 deforming the deflector further toward the front wheel 16. As shown in FIG. 5, a portion of the elbow segment 74 or the engaging end 72 of the reaction force segment 68 engage the front wheel 16 through the wheel well body panel 52. In this embodiment, the deflector 60 engages the tire 50 of the front wheel 16 through the wheel well body panel 52.

Figure 6:
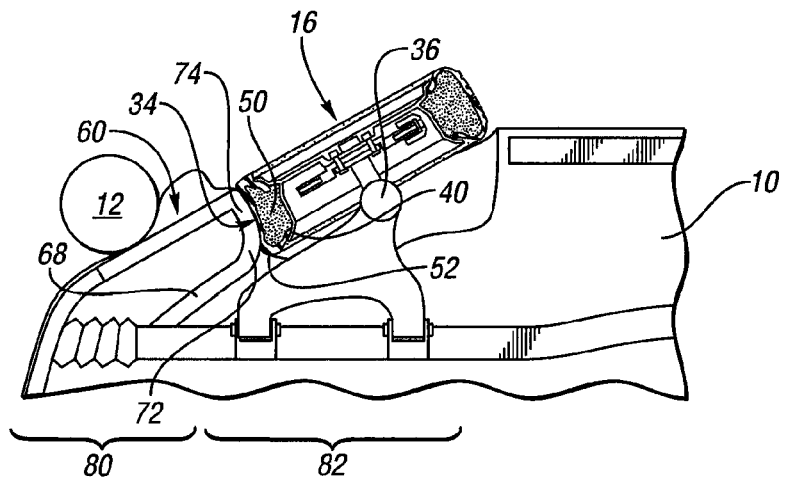
FIG. 6 is a diagrammatic bottom view of a front corner of a vehicle contacting an object with the object deforming a deflector into and engaging an inner rim of a front wheel turning the front wheel inward to the vehicle.

Referring to FIG. 6, the object 12 has deformed the deflector 60 into the deflecting position. The deflecting position may also be referred to as a sliding position. In the deflecting position, the deflector 60 deforms into the front wheel 16 turning the front wheel 16 inward towards the vehicle 10. The front wheel 16 is shown turned inward on the front wheel steering axis 36.

The elbow segment 74 and the engaging end 72 of the reaction force segment 68 cooperate to engage the inner rim 40 of the front wheel 16 through the wheel well body panel 52 and the tire 50. As the elbow segment 74 and engaging end 72 impinge upon the inner rim 40, the force of the impact with the object 12 on the deflector 60 and the deformation of the deflector 60 turn the front wheel 16 inwardly toward a centerline of the vehicle 10. The deflector 60 engages a forward facing radial portion 34 of the front wheel 16. The radial nature of the front wheel 16 may allow for continued engagement of the deflector 60 with the forward facing radial portion 34.

The deflector 60 in the deflecting position functions to turn the front wheel 16 inwardly and also provides a first deflecting boundary to deflect or slide a first portion 80 of the vehicle 10 past the object 12.

Figure 7:
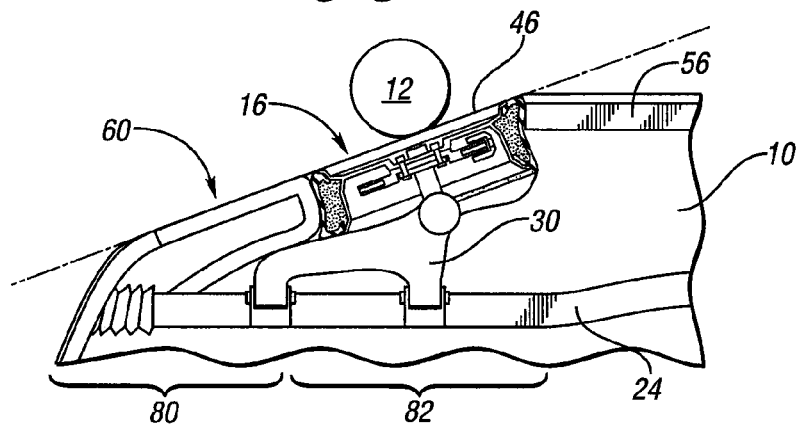
FIG. 7 is a diagrammatic bottom view of a front corner of a vehicle contacting an object with the object contacting an inwardly turned front wheel and pushing the front wheel longitudinally into a rocker member.

Referring to FIG. 7, the object 12 is shown contacting the outer surface 46 of the front wheel 16. The deflector 60 in the deflecting position maintains the front wheel 16 turned inward toward the frame 20 during the offset frontal impact. As the vehicle 10 continues to move forward, the object 12 transitions from the deflector 60 to the front wheel 16. The front wheel 16 provides a second deflecting boundary to deflect or slide a second portion 82 of the vehicle 10 past the object 12.

The front wheel 16 may be pushed longitudinally rearward by the impacting object 12. The front wheel 16 may also be pushed transversely inboard as the vehicle 10 deflects past the object 12 off of the front wheel 16. When the object 12 impacts the front wheel 16, the front end suspension system 30 may deform, or fracture, allowing the front wheel 16 to move longitudinally rearward or transversely inboard on the vehicle 10.

If the front wheel 16 moves transversely inboard on the vehicle 10, the frame rail 24 provides a transverse boundary supporting the front wheel 16 as the vehicle 10 glances off the object 12. If the front wheel 16 moves longitudinally rearward on the vehicle 10, the rocker member 56 provides a longitudinal boundary supporting the front wheel 16 as the vehicle glances off the object 12. During the impact of the front wheel 16 with the object 12, the front end suspension system 30 may also provide a boundary supporting the front wheel 16 as the vehicle 10 glances off the object 12. The front end suspension system 30 may cooperate with either or both of the frame rail 24 and the rocker member 56.

In FIG. 7, the front wheel 16 provides a glancing surface extending substantially between the frame rail 24 and the rocker member 56. The glancing surface may be orientated at an acute angle relative to a longitudinal direction of the vehicle 10.

Figure 8:
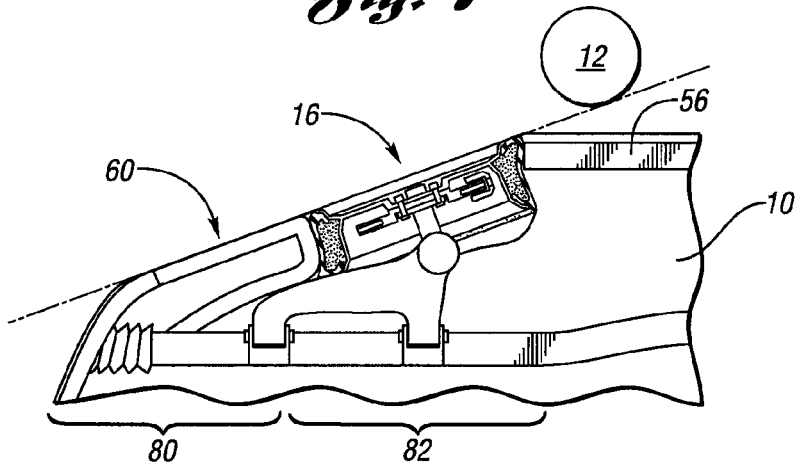
FIG. 8 is a diagrammatic bottom view of a front corner of a vehicle having a deflector and a front wheel that cooperates to allow the vehicle to glance past the object.

Referring to FIG. 8, the first portion 80 and second portion 82 of the vehicle 10 are shown as having glanced past the object 12 with the object 12 being shown disposed outboard of the rocker member 56. If the vehicle 10 continues to have forward momentum, the object 12 is no longer restricting the forward momentum and the vehicle 10. The deflector 60 provides a first deflecting boundary and the inwardly turned front wheel 16 provides a second deflecting boundary and both cooperate to deflect the vehicle 10 off of the impacting object 12 outboard of the rocker member 56. Although the Figure shows the rocker member 56 unaffected by the impact, the object 12 may contact a portion of the rocker member 56 as the vehicle 10 transitions past the object 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for turning a front wheel inward during an offset frontal impact between an impacting object and a vehicle having a frame with a bumper beam and a frame rail, the bumper beam having a span extending transversely across the vehicle, and the frame rail extending longitudinally on the vehicle disposed transversely within the span of the bumper beam, and the front wheel is disposed on the vehicle longitudinally rearward of the bumper beam and transversely outboard of the frame rail, the apparatus comprising:
   a deflector connected to a frame longitudinally forward of a front wheel, the deflector having a normal position and a deflecting position;
   the deflector in the normal position having an impact force receiving segment with an inboard end connected to a point on the frame, the impact receiving segment extending from the frame transversely outboard and longitudinally rearward to an outboard end longitudinally forward of and offset from the front wheel, a reaction force segment having a reaction end spaced from and substantially vertically planar with a portion of the frame rearward of the point on the frame where the inboard end is connected, the reaction force segment extending transversely outboard from the frame rail to an engaging end longitudinally forward of and offset from the front wheel, and an elbow segment disposed between the impact receiving segment and the reaction force segment connecting the outboard end of the impact force receiving segment to the engaging end of the reaction force segment, wherein at least a portion of the elbow segment extends transversely outboard of an inner edge of the front wheel; and
   the deflector deforms into the deflecting position when an object impacts a vehicle during an offset frontal impact of the object with the vehicle, wherein the engagement end of the reaction force segment and the elbow cooperate to engage a portion of the front wheel turning the front wheel inward toward the frame.

2. The apparatus of claim 1, wherein the vehicle has a rocker member extending longitudinally rearward of the front wheel and outboard from the frame rail, the apparatus further comprising:
   the deflector in the deflecting position providing a first deflecting boundary and maintaining the front wheel turned inward toward the frame during the offset frontal impact such that the front wheel provides a second deflecting boundary, wherein the first deflecting boundary and the second deflecting boundary cooperate to deflect the vehicle off of the impacting object outboard of the rocker member.

3. The apparatus of claim 1, wherein the frame has crush cans disposed between the frame rail and the bumper beam, and the apparatus further comprising the deflector connected to the frame forward of the crush cans.

4. The apparatus of claim 1, wherein the deflector is connected to the bumper beam.

5. The apparatus of claim 1, wherein the impact force receiving segment is generally straight throughout the length of the segment.

6. The apparatus of claim 1, wherein the elbow segment is transversely inboard of an outer surface of the front wheel when the front wheel is in a straight position.

7. The apparatus of claim 1, wherein the impact force receiving segment and the reaction force segment form an acute angle at the elbow segment.

8. The apparatus of claim 1, wherein the front wheel may rotate while maintaining a radial portion facing forward on the vehicle and the deflector in the deflecting position engages the forward facing radial portion of the front wheel.

9. The apparatus of claim 1, wherein the deflector in the deflecting position engages the front wheel through a tire.

10. The apparatus of claim 1, wherein the front wheel has an inner and outer rim and a tire dispose around the front wheel between the inner and outer rim, and the deflector in the deflecting position engages the tire and impinges upon the inner rim of the front wheel.

11. The apparatus of claim 1, wherein deflector in the deflecting position engages the front wheel through a wheel well body panel.

12. An apparatus for glancing a vehicle past a laterally offset impacting object, comprising:
   a deflector attached to and extending outboardly from a frame of a vehicle to an elbow segment and continuously extending inboardly to a non-attached reaction end forward of a front wheel, wherein the deflector deforms during a laterally offset impact with an object, the reaction end contacting the frame, the deflector deforming, contacting, and turning the front wheel inward.

13. The apparatus of claim 12, wherein the front wheel provides a first deflection surface and the deflector provides a second deflection surface against the object.

14. The apparatus of claim 12, wherein a frame rail provides a transverse boundary to support the inwardly turned front wheel as the vehicle glances off the object.

15. The apparatus of claim 12, wherein a rocker member provides a longitudinal boundary to support the inwardly turned front wheel as the vehicle glances off the object.

16. The apparatus of claim 12, wherein a front end suspension system provides a lateral and longitudinal boundary to support the inwardly turned front wheel as the vehicle glances off the object.

17. The apparatus of claim 12, wherein the inwardly turned front wheel provides a glancing surface extending substantially between a frame rail and a rocker member.

18. The apparatus of claim 17, wherein the glancing surface is orientated at an acute angle relative to a longitudinal direction of the vehicle.

19. A system for deflecting a vehicle away from an impacting laterally offset object comprising:
 a single unitary piece deflector having an elbow segment disposed between an inboard end connected to and extending from the vehicle and a reaction end extending from the elbow segment back toward the vehicle in front of a front wheel, wherein the deflector deforms when impacted by the object engaging and turning the front wheel inward toward the vehicle.

20. The system of claim 19, wherein the front wheel in the inwardly turned position deflects the vehicle off the object such that the object passes the vehicle outboard of a rocker member of the vehicle.

\* \* \* \* \*